(12) United States Patent
Kahle et al.

(10) Patent No.: US 11,697,368 B2
(45) Date of Patent: Jul. 11, 2023

(54) FIXING DEVICE FOR FIXING A SWAP BODY IN OR ON A PICKUP AREA OF A VEHICLE AS WELL AS A VEHICLE WITH THIS TYPE OF FIXING DEVICE

(71) Applicant: ONOMOTION GMBH, Berlin (DE)

(72) Inventors: Philipp Kahle, Berlin (DE); Tobias Scholtes, Wolfsburg (DE); Normann Loffler, Berlin (DE); Tillmann Epp, Berlin (DE)

(73) Assignee: ONOMOTION GMBH, Berlin (DE)

( * ) Notice: Subject to any disclaimer, the term of this patent is extended or adjusted under 35 U.S.C. 154(b) by 242 days.

(21) Appl. No.: 16/924,243

(22) Filed: Jul. 9, 2020

(65) Prior Publication Data
US 2021/0016699 A1 Jan. 21, 2021

(30) Foreign Application Priority Data

Jul. 19, 2019 (DE) .......................... 102019119691.4

(51) Int. Cl.
*B60P 7/08* (2006.01)
*B60P 1/64* (2006.01)
*B60P 7/13* (2006.01)

(52) U.S. Cl.
CPC ............ *B60P 1/6409* (2013.01); *B60P 1/649* (2013.01); *B60P 7/0815* (2013.01); *B60P 7/13* (2013.01)

(58) Field of Classification Search
CPC ..... B65G 67/04; B62D 33/0207; B60P 1/649; B60P 1/6409; B60P 1/6427
(Continued)

(56) References Cited

U.S. PATENT DOCUMENTS 1,360,412 A * 11/1920 Kirchner .................. B60P 7/13
410/67
1,402,211 A * 1/1922 Cartmill .................. B61H 9/04
410/66
(Continued)

FOREIGN PATENT DOCUMENTS

CA 2867974 A1 4/2016
DE 661878 C 6/1938
(Continued)

OTHER PUBLICATIONS

German Search Report in corresponding German Application No. 102019119691.4, dated Mar. 25, 2020.
(Continued)

*Primary Examiner* — Stephen T Gordon
(74) *Attorney, Agent, or Firm* — Hamre, Schumann, Mueller & Larson, P.C.

(57) ABSTRACT

A fixing device for fixing a swap body in or on the pick-up area of a vehicle. At least one support structure is positioned in the pick-up area, with at least one pick-up floor positioned in the pick-up area, with at least one rail-style guide element spaced from the pick-up floor which is fixed to the support structure or the swap body and which demonstrates a guide surface. At least one support element is positioned on a swap body or on the support structure which is positioned between the guide element and pick-up floor when transferring the swap body into the pick-up area or out of the pick-up area. At least the guide surface of at least one guide element demonstrates an incline in relation to the pick-up floor.

12 Claims, 3 Drawing Sheets

(58) Field of Classification Search
USPC ............. 414/498, 522; 296/26.09, 37.6, 39.2
See application file for complete search history.

(56) References Cited

U.S. PATENT DOCUMENTS

| | | | | |
|---|---|---|---|---|
| 3,817,413 | A * | 6/1974 | Ham | B60P 1/6427 |
| | | | | 414/498 |
| 4,133,440 | A * | 1/1979 | Heidrick, Jr. | B60P 3/122 |
| | | | | 410/66 |
| 4,231,695 | A * | 11/1980 | Weston, Sr. | B65G 67/20 |
| | | | | 414/498 |
| 4,805,859 | A | 2/1989 | Hudson | |
| 5,848,869 | A | 12/1998 | Slocum et al. | |
| 7,172,378 | B1 * | 2/2007 | Cerullo | B60P 1/6454 |
| | | | | 410/80 |
| 2014/0259837 | A1 * | 9/2014 | Belliveau | G16H 20/17 |
| | | | | 40/673 |
| 2017/0036872 | A1 | 2/2017 | Wallace et al. | |
| 2018/0125060 | A1 * | 5/2018 | Glass | C09D 1/00 |

FOREIGN PATENT DOCUMENTS

| | | |
|---|---|---|
| DE | 102014009780 A1 | 1/2016 |
| DE | 102014114996 A1 | 4/2016 |
| DE | 202016106717 U1 | 1/2017 |
| EP | 2420406 A1 | 2/2012 |
| FR | 2977229 A1 | 1/2013 |
| WO | 2010/002700 A1 | 1/2010 |

OTHER PUBLICATIONS

European Search Report in corresponding European Application No. 20181158.5, dated Dec. 2, 2020.
Office Action issued for Canadian Patent Application No. 3087374, dated Nov. 15, 2021, 8 pages.
Office Action issued for Canadian Patent Application No. 3087374, dated Jul. 20, 2022, 7 pages.
Office Action issued for Canadian Patent Application No. 3087374, dated Mar. 3, 2023, 6 pages.
Office Action issued for European Patent Application No. 20181158.5, dated Dec. 9, 2021, 5 pages.
Office Action issued for European Patent Application No. 20181158.5, dated Jul. 6, 2022, 4 pages.
Office Action issued for Singaporean Patent Application No. 10202006548Y, dated Mar. 23, 2021, 10 pages.
Office Action issued for German Patent Application No. 102019119691.4, dated Feb. 24, 2022, 6 pages.

* cited by examiner

FIXING DEVICE FOR FIXING A SWAP BODY IN OR ON A PICKUP AREA OF A VEHICLE AS WELL AS A VEHICLE WITH THIS TYPE OF FIXING DEVICE

CROSS REFERENCE TO RELATED APPLICATIONS

This application claims the benefit of German priority application DE 10 2019 119 691.4, filed Jul. 19, 2019, which is incorporated by reference.

FIELD OF THE INVENTION

The invention relates to a fixing device for fixing a swap body in or on a pick-up area of a vehicle with at least one support structure positioned in the pick-up area, with at least one pick-up floor positioned in the pick-up area, with at least one rail-style guide element spaced from the pick-up floor which is fixed to the support structure or the swap body and which demonstrates a guide surface and with at least one swap body or support aid positioned on the support structure which is positioned between the guide element and pick-up floor when transferring the swap body into the pick-up area or out of the pick-up area and can at least be sectionally slid onto or rolled off touching the guide surface of the rail-style guide element and can be or is supported against transverse movement to the direction of transfer as well as a vehicle with this type of fixing device.

BACKGROUND

Vehicles are known in the state of the art technology with which swap bodies can be transported, where U-profiles are positioned in the pick-up area in order to fix the swap bodies, in which the swap bodies can be led into position on their castors. They are guided using the side walls of the U-profiles, which are in direct contact with the flanks of the swap body castors. In this type of fixing device, it has proven disadvantageous that the swap body castors are subject to a high degree of wear and that it is constantly necessary to maintain an identical wheel distance between the front and rear wheels of the swap body.

Furthermore, there are vehicles for transporting swap bodies in which the swap bodies are not or are insufficiently guided during transfer to the pick-up area and are fixed using a form closure. It has proven disadvantageous here to align the swap body in such a way in the pick-up area so as to create the form closure, even with poor insight.

Further, when driving the vehicle over bumpy roads, a relative movement between the swap body and pick-up are in the direction transverse to the pick-up floor can never be fully prevented due to the forces of inertia, which can lead to damages to the swap body and/or pick-up floor.

SUMMARY OF THE INVENTION

One objective of the embodiment of the invention is to make it easier to position and fix a swap body in or on a pick-up area of a vehicle and to improve this.

This objective was solved with the input of the fixing device mentioned, where the guide surface of at least one incline guide element demonstrates an incline in relation to the pick-up floor.

When the guide surface of at least one incline guide element demonstrates an incline in relation to the pick-up floor, the swap body is held in two directions transverse to the transfer direction. This guarantees that the swap body lies on the pick-up floor not only during cornering, but also on bumpy roads and that it is extensively fixed in place relative to the support structure.

The swap body can be positioned in the pick-up area using wheels or castors, for example. To this end, a ramp is anticipated in the design of the fixing device, with which the swap body can be rolled onto pick-up floor of the pick-up area. This makes it possible to overcome a height discrepancy between the road and the pick-up floor.

Furthermore, it is conceivable that the swap body is positioned on runners or similar on the pick-up floor of the pick-up area.

The provision of the guide element means the swap body can be led in a linear manner.

The transfer direction can be parallel to the vehicle's longitudinal axis or transversal axis. Furthermore, interim forms are conceivable, for example that the direction of transfer runs diagonal to the vehicle's longitudinal axis.

The vehicle can be any kind, in particular a land vehicle, water vehicle and/or aircraft. If the vehicle concerns a land vehicle, this can be a car, lorry or tilting vehicle. Tilting vehicles include bicycles, pedelecs, motorbikes or motor vehicles which resemble motorbikes, such as, in particular, two, three or four-wheeled scooters, tilting trikes, quads or similar.

If the vehicle is a tilting vehicle, it proves advantageous if this includes a load-bearing pick-up area positioned in front of or behind a driver area and in the direction of travel.

In order to be able to guarantee the pick-up of different swap bodies, an adjustment unit is anticipated in the design of the fixing device with which the incline of the guide surface of the guide element can be adjusted either in stages or infinitely in respect to the pick-up floor.

In addition, the adjustment of the fixing device an be further improved for numerous swap bodies if the fixing device includes at least one clamping unit with which the guide element can be clamped in direction to the support device and/or through which the support device can be clamped in direction to the guide element.

The clamping unit and the adjustment unit can include a joint component. It is further conceivable that the adjustment unit and clamping unit include components which are separate or can be separated from one another.

It proves advantageous if the guide element and the support structure or, if the guide element and swap body are temporarily or permanently fixable or fixed to one another or include a joint component and/or if the support device and support structure, or if the support device and swap body are temporarily or permanently fixable or are fixed to one another or include a joint component.

If the guide element and the support structure or the guide element and swap body are temporarily or permanently fixable or fixed to one another, the guide element can be easily replaced or repaired. If the guide element and support structure or guide element and swap body include a joint component, the fixing device can be formed so as to reduce components.

The same applies accordingly for the support device.

The guide element and support device can generally be positioned at any height in respect to the pick-up floor. It proves advantageous if the guide element and the support device are positioned at the height of a surface of the swap body facing the pick-up floor, which has a minimal distance to the pick-up floor.

In the continued development of the fixing device, it is anticipated that the support device includes at least one support element which can at least be sectionally slid or rolled off the touching the guide surface of the rail-type guide element and in particular includes a runner or castor and/or the support aid includes at least one load-bearing element with which the support aid can be fixed to the swap body or support structure and to which one end of the support element can be positioned.

Through the provision of a support element and a load-bearing element, the support aid can easily be fixed to the swap body or the support structure. The support element may, for example, have a runner-style form and glide along touching the guide surface of the guide element when transferring the swap body into a pick-up area or out of a pick-up area. Furthermore, the support element can have a castor-style design and roll off along the guide element. In such a case, the castor-style designed support element is fixed to the load-bearing element using a bearing.

In general, the guide element can be positioned both on the support structure of the pick-up area as well as on the swap body. The support body here is positioned on the respective other component. In other words, if the guide element is positioned on the support structure of the pick-up area, the support aid is positioned on the swap body. If the guide element is positioned on the swap body, the support aid is positioned on the support structure of the pick-up area.

For the embodiment of the fixing device, it is anticipated that at least one guide element is positioned on the support structure of the pick-up area and/or that at least one support aid is positioned on the swap body.

In order to further increase the stability of the position of the swap body within the pick-up area, at least two guide elements and at least two support devices are anticipated in the embodiment of the fixing device, which are respectively positioned on opposite sides to one another and the swap body is positioned between both guide elements and support aids.

It is generally conceivable that both guide elements and both support aids are positioned respectively on the same side of the swap body. In such a case, these can be positioned at different heights to one another. It is further conceivable that the guide elements are respectively positioned on different sides of the swap body. This further increases the stability of the swap body when positioning in the pick-up area. Both of the guide elements and both of the support aids can be positioned at the same height, in particular with the same distance to the pick-up floor or include different heights, in particular distance to the vehicle floor.

It proves advantageous if the support device includes at least two support elements which are positioned on opposite sides of the support element to one another and extend across the width of the swap body-observed transverse to the transfer direction.

In such a case, the support device can be supported by two guide elements opposite one another. This means the fixing device can be formed with reduced components.

In order to make it easier to position the swap body on the pick-up area, it proves advantageous if the fixing device includes at least one centring unit which includes at least two guide elements which together incorporate a funnel-shaped section through which the swap body can essentially be positioned in the middle of the pick-up area when transferring onto or into the pick-up area.

This is a simple way to guarantee the guidance of the swap body when transferring to the pick-up area.

In order to fix the swap body against movement in or against the direction of transfer after it has been positioned in the pick-up area, at least one retaining element positioned on the support structure or swap body is anticipated in the design of the fixing device, which can be transferred from a locked position to a release position by engaging in pick-up on the swap body or on the support structure and fixes the swap body against moving in the direction of transfer, in which the swap body is released for movement in the direction of transfer.

The retaining element can create a form or traction closure between the swap body and pick-up area.

In the continued development of the last design mentioned, it proves advantageous if the retaining element has a pin-style form and can be transferred in or transverse to the transfer direction from the locked position to the release position and back.

This makes the retaining element simple and cost-effective to manufacture.

Furthermore, it proves advantageous in the continued development if the retaining element is positioned on the pick-up floor of the pick-up area and can be transferred transverse to the direction of transfer of the locked position to the release position and back and/or if the retaining element includes at least one reset device through which the retaining pin can be pre-clamped in the locked position.

This can guarantee that the retaining element automatically clicks in to the swap body as soon as this is in the pick-up area.

The retaining element can be equipped with a mechanical or electro-mechanical unlocking element in order to release the retaining element which, for example, can be manually activated by the vehicle operator, in order to release the swap body from the retaining element.

In order to balance the manufacturing tolerances of the swap body, in particular the pick-up device and retaining element, it is anticipated in the embodiment of the fixing device that the pick-up device includes a contour which tapers in the direction of transfer on which the retaining element fits in the locked position.

This guarantees an essentially backlash-free fixing of the retaining element in the pick-up device.

Ultimately, the objective was solved by a vehicle with a pick-up area in which a swap body can be fixed by a fixing device with at least one of the previously mentioned characteristics, which demonstrates at least one support structure positioned in the pick-up area, at least one pick-up floor positioned in the pick-up area, at least one rail-style guide element spaced from the pick-up floor which is fixed to the supporting structure or the swap body and a guide surface and with at least one swap body or support aid positioned on the supporting structure which is positioned between the guide element and pick-up floor when transferring the swap body into the pick-up area or out of the pick-up area and can at least be sectionally slid onto or rolled off touching the guide surface of the rail-style guide element and can be or is supported against transverse movement to the direction of transfer, whereby at least the guide surface of at least one guide element demonstrates an incline in relation to the pick-up floor.

Further features, details and advantages of the invention will become apparent from the appended claims, the drawings and the following description of a preferred embodiment of the fixing device.

DETAILED DESCRIPTION OF THE INVENTION

Figure 1:
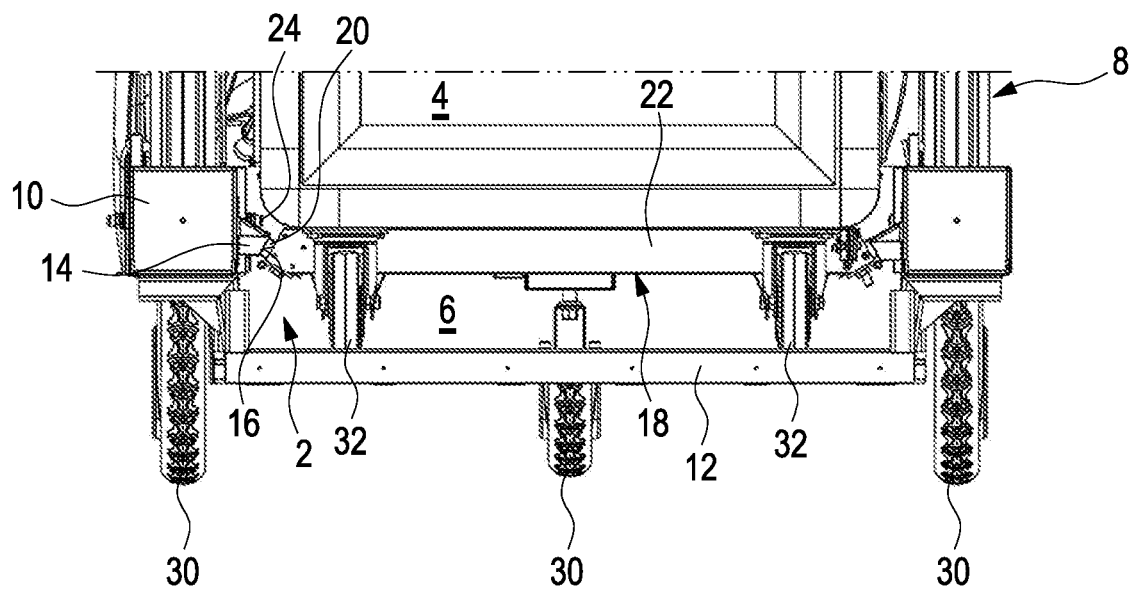
FIG. 1 A sectional back view of a vehicle with a fixing device according to the invention.

The figures show fixing device equipped overall with references 2 for fixing a swap body 4 in or on a pick-up area 6 of the vehicle 8. A support structure 10 is positioned in pick-up area 6 of the vehicle 8. Further, the pick-up area 6 of the vehicle 8 includes a pick-up floor 12 positioned in pick-up area 6.

The fixing device 2 includes at least one rail-style guide element 14 spaced from the pick-up floor 12. In the embodiments shown in the Figures, the rail-style guide element is fixed to support structure 10 of the vehicle 8. The guide element 14 includes a guide surface 16. Moreover, the fixing device 2 includes support aids 18 which are fixed to the swap body 4 in the embodiments shown in the Figures. The support aids 18 include two support elements 20 which have a castor-style form and are fixed to a load-bearing element 22. The support aids 18 are fixed to the floor of the swap body 4 via the load-bearing element 22. Furthermore, the support elements 20 of the support aid 18 fit to the guide surface 16 of the guide element 14, if the swap body 4 is positioned in the pick-up area 6.

When transferring and positioning the swap body 4 in the pick-up area 6 of the vehicle 8, the swap body 4 is supported via support aid 18 on the guide surface 16 and is supported on this by touch sliding or rolling against movement transverse to the direction of transfer. The guide surfaces 16 are inclined in relation to the pick-up floor 12.

In order to be able to set the incline of guide surface 16 of the guide element 14, the fixing device 2 includes an adjustment unit 24 which can be used to adjust the incline of the guide surface 16 in relation to the pick-up curve 12.

The Figures show an embodiment of the fixing device 2 in which the guide element 14 is detachably fixed to the support structure 10 of the vehicle 6. The support elements 18 are also detachably fixed to swap body 4.

Guide element 14 and support element 18 are positioned on one of the surfaces of the swap body 4 facing the pick-up floor 12, whereby the distance to the pick-up floor 12 is minimal.

In order to guarantee the guidance of the swap body when transferring to pick-up area 6, two guide elements 14 are anticipated in the embodiment shown in the Figures, which are positioned on opposite sides to one another in relation to the swap body 4. This holds the swap body 4 on both sides with guide element 14.

In order to fix the swap body 4 against movement in the direction of transfer, the fixing device 2 includes a pin-style retaining element 26 which is fixed into the pick-up floor 12. The pin-style retaining element 26 can fit into a correspondingly formed pick-up device 28 in the swap body 4 if the swap body 4 is positioned in pick-up area 6. To this end, the retaining element 26 is pre-clamped in a locked position by a reset element which cannot be seen in the Figures, in which the retaining element 26 fits into the pick-up device 28. The retaining element 26 can be transferred from the locked position into a release position, in which the retaining element 26 is unmeshed from the pick-up device 28 in the swap body 4, in order to remove swap body 4 from the pick-up area 6.

FIG. 1 shows a view of an area of the vehicle 8. This includes a cargo bicycle in the embodiment shown in the Figure. To this end, the vehicle 8 includes three wheels 30 with which the vehicle 8 can be driven on a driving surface. The swap body 4 for its part includes castors 32 with which the swap body 4 can be brought up to the pick-up area 6 via a ramp, for example.

FIG. 1 shows that the swap body 4 is essentially centred in pick-up area 6 of the vehicle 8 using fixing device 2. This enables the mass point of the swap body 4 to be aligned transversely with the mass point of the vehicle 8, whereby the driving properties of the vehicle 8 are improved.

Figure 2:
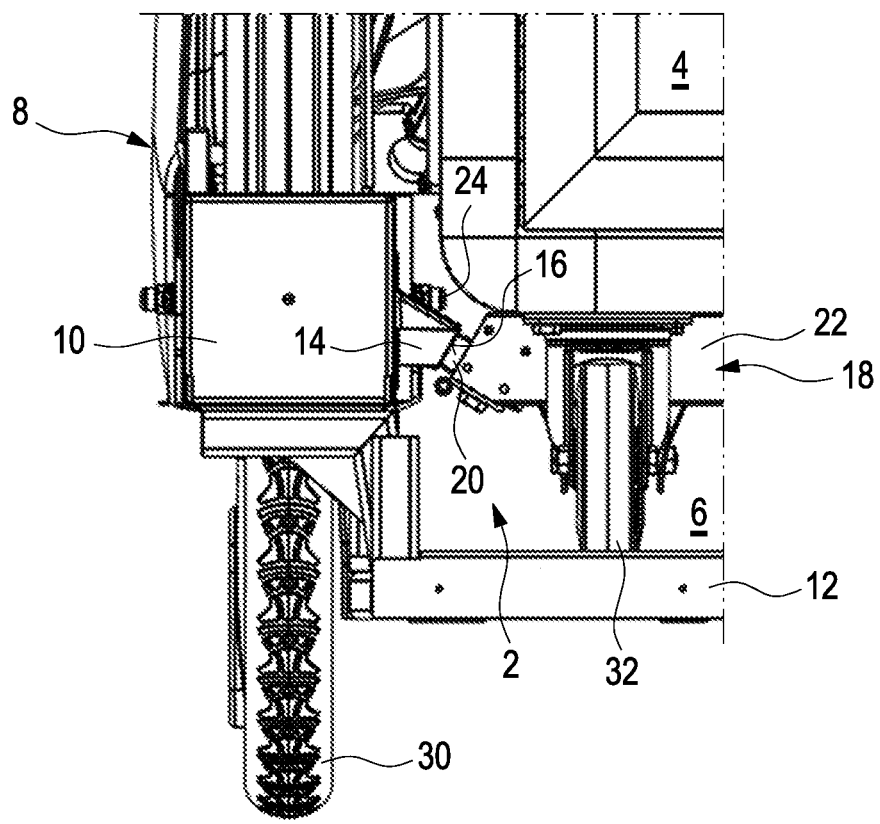
FIG. 2 A detailed view of an area according to FIG. 1.

FIG. 2 shows a detailed view of the area according to FIG. 1.

Figure 3:
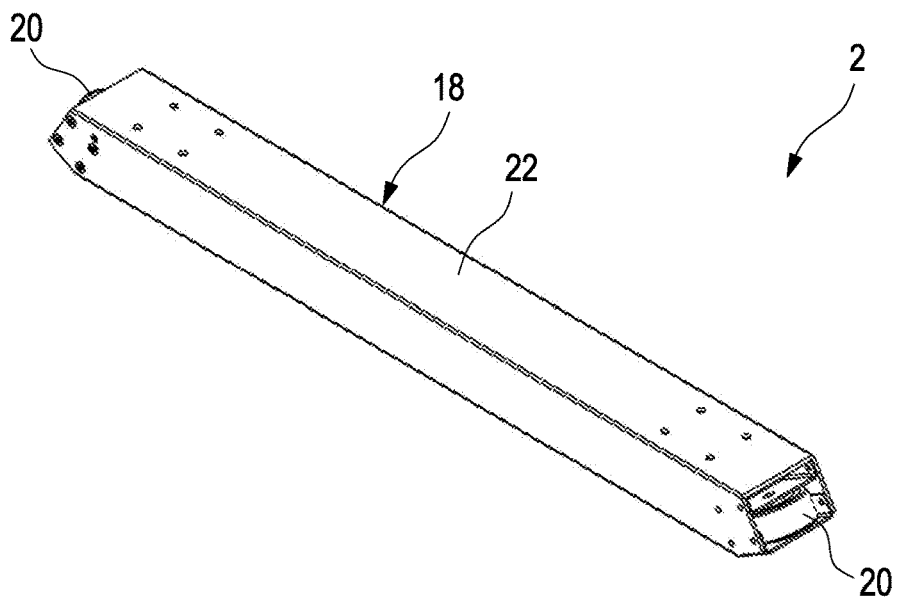
FIG. 3 A perspective plan view of a support aid of a fixing device.

FIG. 3 shows a detailed view of the support element 18. In FIG. 3 it can be seen that the support element 18 includes a load-bearing element 22 where the castor-style support elements 20 are formed on its free ends.

Figure 4:
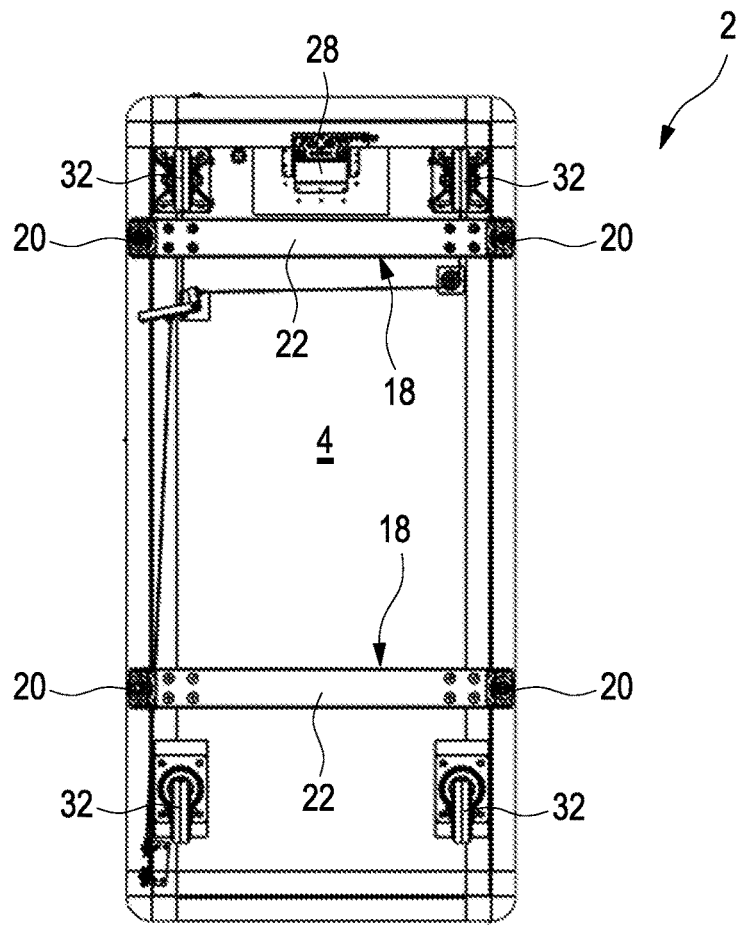
FIG. 4 A bottom view of a swap body with two support aids.

In FIG. 4 it can be seen that the support elements 18 can be positioned in the front and back area of the swap body 4 according to FIG. 3. This are detachably screwed to the floor of the swap body 4 according to the embodiment in FIG. 4.

Figure 5:
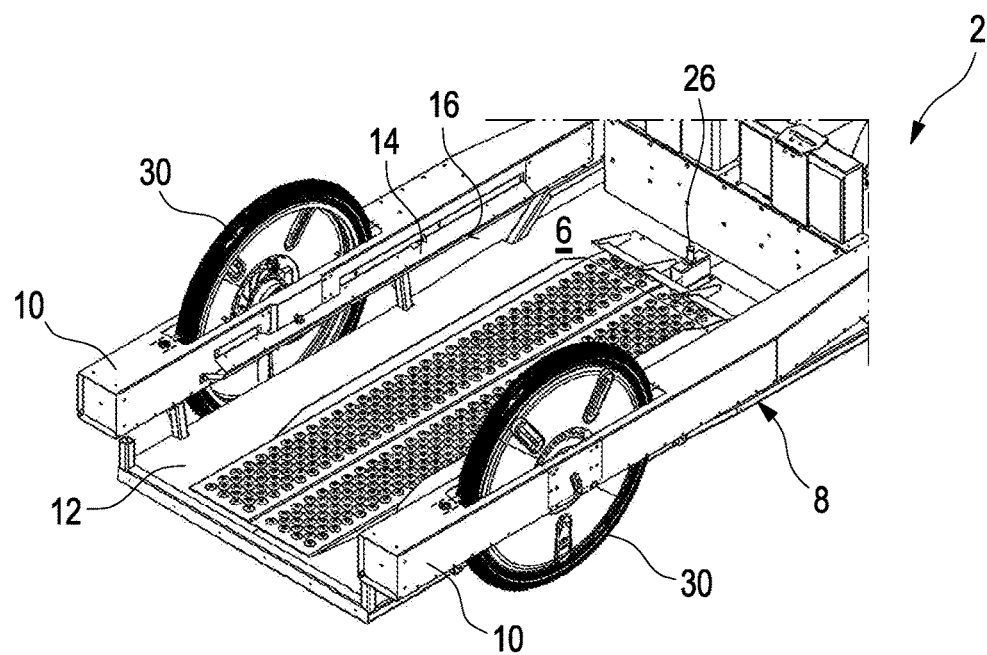
FIG. 5 A perspective plan view of a pick-up area of the vehicle.
Figure 6:
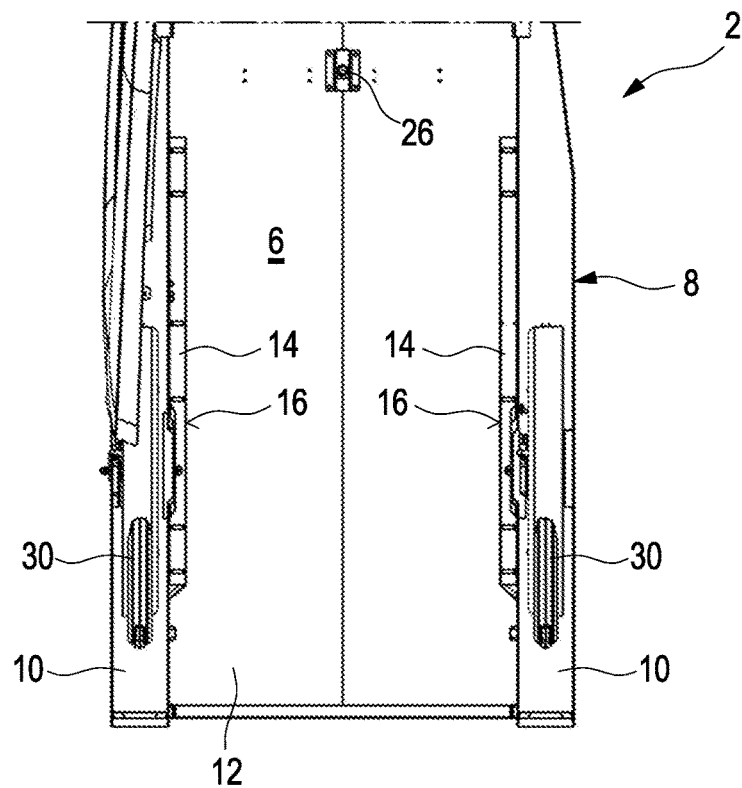
FIG. 6 A plan view of the pick-up area of the vehicle according to FIG. 5.

FIGS. 5 and 6 show a pick-up area 6 of the vehicle 8.

The features of the invention disclosed in the above description, in the claims and in the drawing, may be essential both individually and in any combination in the realisation of the invention in its various embodiments.

REFERENCE LIST

2 Fixing device
4 Swap body
6 Pick-up area
8 Vehicle
10 Support structure
12 Pick-up floor
14 Guide element
16 Guide surface
18 Support aid
20 Support element
22 Load-bearing element
24 Adjustment unit
26 Retaining element
28 Pick-up
30 Wheels
32 Castors

The invention claimed is:

1. A fixing device for fixing a swap body in or on a pick-up area of a vehicle comprising:
   at least one support structure positioned in the pick-up area,
   at least one pick-up floor positioned in the pick-up area,
   at least one rail-style guide element spaced from the at least one pick-up floor which is fixed to the at least one support structure or the swap body and which has a guide surface, and
   at least one support aid positioned on the swap body or on the at least one support structure which is positioned between the at least one guide element and the at least one pick-up floor when transferring the swap body into the pick-up area or out of the pick-up area and can at least be partially slid onto or rolled off touching the guide surface of the at least one rail-style guide element and can be or is supported against transverse movement to a direction of transfer, wherein at least the guide surface of the at least one guide element has an incline in relation to the pick-up floor, wherein at least one retaining element is attachable to the support structure or the swap body, which fits into a pick-up device on the swap body or the support structure and fixes the swap body against movement in the direction of transfer, and is configured to be transferred into a release position in which the swap body is released for movement in the direction of transfer and wherein the at least one retaining element is positioned on the at least one pick-up floor of the pick-up area and is configured to be transferred between a locked position and the release position, wherein the at least one retaining element is transferable in a direction transverse to the direction of transfer.

2. The fixing device according to claim 1, wherein at least one adjustment unit is provided, with which the incline of the guide surface of the at least one guide element can be adjusted in stages or infinitely in relation to the pick-up floor.

3. The fixing device according to claim 1, wherein the at least one guide element and a support aid are positioned at a height of one of surfaces of the swap body facing at least one of the at least one pick-up floor, with a minimal distance to the pick-up floor.

4. The fixing device according to claim 1, wherein the at least one support aid includes at least one support element which is configured to at least be partially slid or rolled off in contact with the guide surface of the at least one guide element and in particular includes a runner or castor and/or the at least one support aid includes at least one load-bearing element with which the at least one support aid can be fixed to the swap body or the support structure and to which one end of the support element can be positioned.

5. The fixing device according to claim 1, wherein the at least one guide element is positioned on the support structure of the pick-up area or at least one support element is positioned on the swap body.

6. The fixing device according to claim 1, wherein the at least one guide element includes at least two guide elements and the at least one support aid includes at least two support aids, wherein the at least two guide elements and the at least two support aids are positioned opposite one another and wherein the swap body is positioned between the at least two guide elements and the at least two support aids.

7. The fixing device according to claim 4, wherein the at least one support aid includes at least two support elements which are positioned on opposite sides of the load-bearing element and is stretched across a width of the swap body, when observed transverse to a direction of transfer.

8. The fixing device according to claim 6, wherein the at least two guide elements are provided as a funnel-shaped section through which the swap body is positioned centrally in the pick-up area during transfer on or in the pick-up area.

9. The fixing device according to claim 1, wherein the retaining element has a pin-style shape and can be transferred from a locked position into the release position and back transverse to the direction of transfer.

10. The fixing device according to claim 1, wherein the retaining element includes at least one reset device through which the at least one retaining element is able to be pre-clamped in the locked position.

11. The fixing device according to claim 1, wherein the pick-up device includes a contour tapering in the direction of transfer, on which the at least one retaining element is positioned in the locked position.

12. A vehicle with the pick-up area in which the swap body is able to be fixed by a fixing device according to claim 1, wherein the fixing device comprises:
the at least one support structure positioned in the pick-up area for fixing the swap body,
the at least one pick-up floor positioned in the pick-up area,
the at least one rail-style guide element spaced from the pick-up floor, which is fixed to the at least one support structure or the swap body and which has a guide surface, and
the at least one support aid positioned on the swap body or on the at least one support structure which is positioned between the at least one guide element and the pick-up floor when transferring the swap body into the pick-up area or out of the pick-up area and can at least be partially slid onto or rolled off in contact with the guide surface of the at least one guide element and can be or is supported against transverse movement to the direction of transfer,
wherein at least the guide surface of the at least one guide element has an incline in relation to the pick-up floor,
wherein the at least one retaining element is attachable to the support structure or the swap body, which fits into a pick-up device on the swap body or the support structure and fixes the swap body against movement in the direction of transfer, and is configured to be transferred into the release position in which the swap body is released for movement in the direction of transfer and wherein the at least one retaining element is positioned on the at least one pick-up floor of the pick-up area and is configured to be transferred between the locked position and the release position, wherein the at least one retaining element is transferable in a direction transverse to the direction of transfer.

* * * * *